(12) United States Patent
Trajkovska-Petkoska et al.

(10) Patent No.: US 7,238,316 B2
(45) Date of Patent: Jul. 3, 2007

(54) METHOD FOR MAKING PRECISELY CONFIGURED FLAKES USEFUL IN OPTICAL DEVICES

(75) Inventors: Anka Trajkovska-Petkoska, Rochester, NY (US); Stephen D. Jacobs, Pittsford, NY (US); Tanya Z. Kosc, Rochester, NY (US); Kenneth L. Marshall, Rochester, NY (US)

(73) Assignee: University of Rochester, Rochester, NY (US)

( * ) Notice: Subject to any disclaimer, the term of this patent is extended or adjusted under 35 U.S.C. 154(b) by 609 days.

(21) Appl. No.: 10/383,603

(22) Filed: Mar. 7, 2003

(65) Prior Publication Data

US 2004/0173927 A1 Sep. 9, 2004

(51) Int. Cl.
*B28B 7/32* (2006.01)
(52) U.S. Cl. .................. 264/482; 264/105; 264/297.8; 264/219; 264/313
(58) Field of Classification Search ............ 264/400, 264/482, 104, 105, 297.8, 313, 338, 219; 249/117, 127; 425/440
See application file for complete search history.

(56) References Cited

U.S. PATENT DOCUMENTS 2,505,947 A * 5/1950 De Brocke ............... 249/127
5,364,557 A 11/1994 Faris
5,792,411 A * 8/1998 Morris et al. ............. 264/400
6,136,251 A * 10/2000 Etzbach et al. .......... 264/297.8

FOREIGN PATENT DOCUMENTS

WO    WO 01/88607 A1    11/2001

OTHER PUBLICATIONS

Kosc, Tanya et al., Electric-field-induced motion of polymer cholesteric liquid-crystal flakes in a moderately conductive fluid, Applied Optics, vol. 41, No. 25, pp. 5362-5366 (2002).
Srinivasan, U. et al., MEMS: Some Self-Assembly Required, Optics & Photonics News, pp. 21-24 (Nov. 2002).
Branham, Michael et al., Rapid Communications: Rapid prototyping of micropatterned substrates using conventional laser printers, J. Mater. Res., vol. 17, No. 7, pp. 1559-1562 (2002).
Kumar, A. et al., Features of gold having micrometer to centimeter dimensions can be formed through a combination of stamping with an elastomeric stamp and an alkanethiol "ink" followed by chemical etching, Appl. Phys. Lett. vol. 63, No. 14, pp. 2002-2004 (1993).

* cited by examiner

*Primary Examiner*—Mathieu D. Vargot
(74) *Attorney, Agent, or Firm*—Martin Lukacher; Kenneth J. Lukacher

(57) ABSTRACT

Precisely configured, especially of geometric shape, flakes of liquid crystal material are made using a mechanically flexible polymer mold with wells having shapes which are precisely configured by making the mold with a photolithographically manufactured or laser printed master. The polymer liquid crystal is poured into the wells in the flexible mold. When the liquid crystal material has solidified, the flexible mold is bent and the flakes are released and collected for use in making an electrooptical cell utilizing the liquid crystal flakes as the active element therein.

25 Claims, 5 Drawing Sheets

US 7,238,316 B2

METHOD FOR MAKING PRECISELY CONFIGURED FLAKES USEFUL IN OPTICAL DEVICES

The United States Government, acting through the U.S. Department of Energy has rights in this invention pursuant to agreement DE-FC03-92SF19460.

DESCRIPTION

The present invention relates to methods of making flakes of plastic (flowable) material which have precise configurations, and particularly to making flakes of liquid crystal material, especially polymer cholesteric liquid crystal (PCLC) flakes for use in electrooptical devices, and especially devices using polymer liquid crystal fluid host systems contained in cells, as described in International Publication No. WO 01/88607, published Nov. 22, 2001, having priority to U.S. patent application Ser. No. 09/571,805, filed May 16, 2000, and also in an article entitled "Electric-field-induced motion of polymer cholesteric liquid-crystal flakes in a moderately conductive fluid" by T. Z. Kosc et al., Applied Optics, Vol. 41, No. 25, pages 5362–5366, Sep. 9, 2002. The invention may also be found useful in producing precisely configured flakes of microscopic size (of the order of micrometers or hundreds of micrometers along each side of the flakes) or other moldable materials that are releasable in the same manner as polymer liquid crystal materials, such materials may be used in microelectronic devices and other devices which may be manufactured by microelectromechanical systems (MEMS) assembly. Such devices are mentioned in an article appearing on Optics and Photonics News, pages 21–24 and 56, November 2002.

The methods for making microscopic flakes suitable for use in electrooptic devices, such as mentioned in the above-identified publications, have not been effective in providing flakes of precise configuration, more particularly, providing flakes of precise geometric shapes and thicknesses, such as rectangles, squares, triangles, diamonds, circles, ellipsoids, trapezoids, and parallelograms. Such shapes enhance the electrooptical characteristics of the devices and are desirable for use in such devices as well as in other applications where the flakes or platelets must be precise in order to fit together as is the case in MEMS assembly. The polymer liquid crystal flakes that have been heretofore available are prepared from continuous thin polymer liquid crystal films that are shock-cooled with, for example, liquid nitrogen. The film fragments are then removed from the support substrate. See, U.S. Pat. No. 5,364,557, issued Nov. 15, 1994 to S. M. Faris. Such freeze-fracture methods for manufacturing PCLC flakes resulted in arbitrary shapes. Thus, it is desirable to produce flakes in pre-defined and regular geometries, such as squares, rectangles, diamonds, triangles, ellipsoids, circles, and of microscopic dimensions. An example is in the case of rectangular flakes, which may be of from 4–6 microns (μm) thick and from 12–80 μm along the sides thereof.

In the case of flakes produced by the freeze-fracture method discussed above, they may require sorting upon collection to obtain individual flakes with similar shapes and sizes. It is not practicable to produce any significant quantity of a specific shape in reasonable time. It is further desirable to produce the flakes in large quantity and rapidly; for example, thousands of flakes of the desired configuration at a time.

Accordingly, it is a principal feature of the present invention to provide methods of manufacture of flakes, particularly of polymer liquid crystal material for use in electrooptical devices, which have precise configurations which enhance the electrooptical characteristics of such devices, and which may be produced at rapid rates.

Briefly described, the method of manufacture of flakes (or platelets) in accordance with the invention utilizes a flexible mold which may be formed with wells having configuration and size corresponding to the desired configuration and size of the flakes. The wells may have smooth surfaces, or the bottoms of each well may be finely textured with random or regular arrays of sub-micron protuberances or depressions. This mold may be a mechanically flexible polymer mold containing wells that are replicas of the flakes. The mold may be made with a photolithographically produced master or laser printed patterns. The source material for flake generation is rendered into a molten state by heat or addition of a solvent and is poured into the wells in the mold and allowed to solidify. When solid, the flakes are more rigid and less flexible than the mechanically flexible polymer mold. The flakes are extracted from the mold and collected by bending or otherwise flexing the mold thereby causing the flakes to pop out on a collection surface. The mold may be flexed or stretched to change the configuration of the wells and the shape of the flakes produced using the mold. For example, the stretching may be along a side of the wells or in a direction of a line between the corners of the wells or in two directions which may be perpendicular. The material to be processed, for example a PCLC, is poured into the stretched mold. The resulting flakes will then be rectangular or diamond shaped depending upon the direction of stretching. The mold may be disposed on a substrate, which may be thermally quenched to assist in the solidification of the polymer flake material. The mold with the solidified flakes contained in the wells is removed from the substrate, and the flakes are released by bending the mold as discussed above.

The foregoing and other objects, features and advantages of the invention will be more apparent from a reading of the following description in connection with the accompanying drawings in which.

Figure 3:
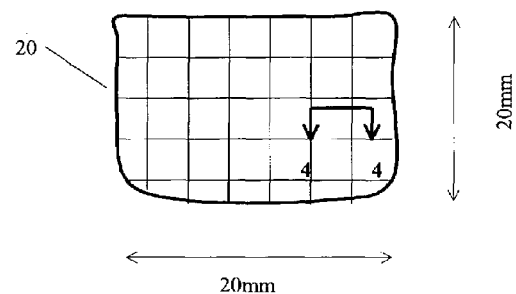
FIG. 3 is a plan view of a mechanically flexible polymer replica made from the master shown in FIGS. 1 and 2.
Figure 4:
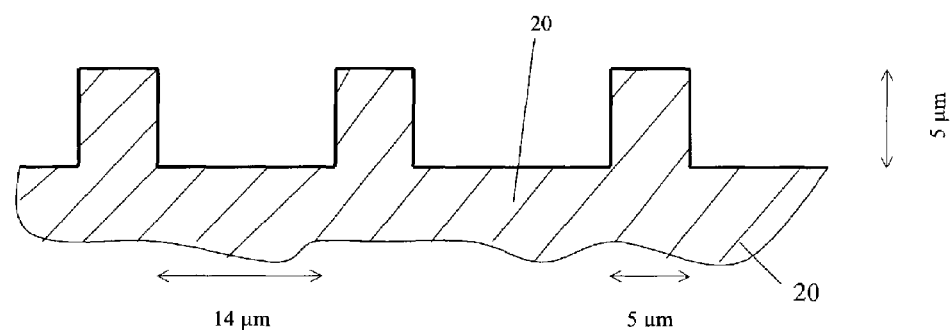
FIG. 4 is a sectional view illustrating the cross-section of the wells or receptacles in the replica which receptacles may be square and of the order of about approximately 10 μm on each side, when made with the master shown in FIGS. 1 and 2.
Figure 5:
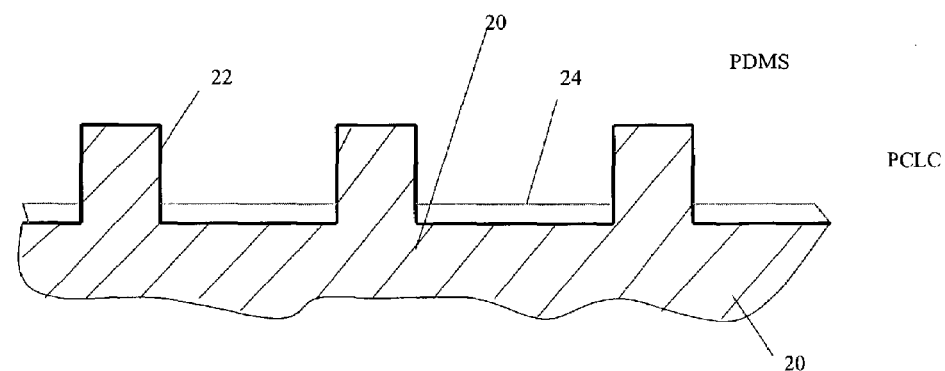
Figure 6:
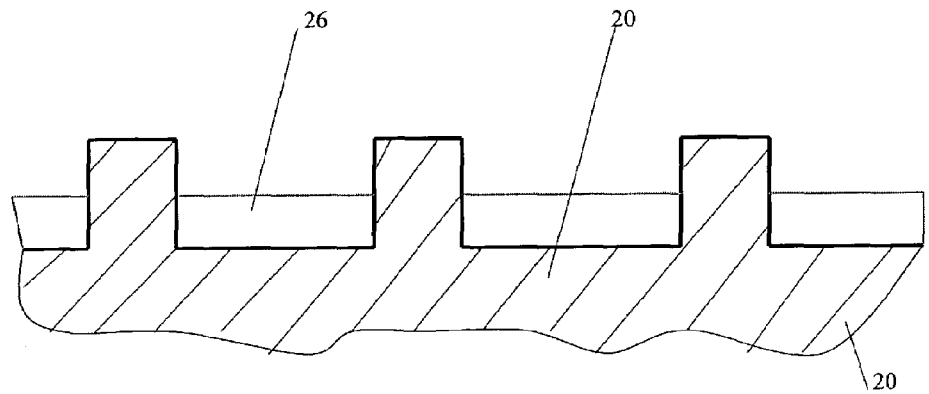
Figure 7:
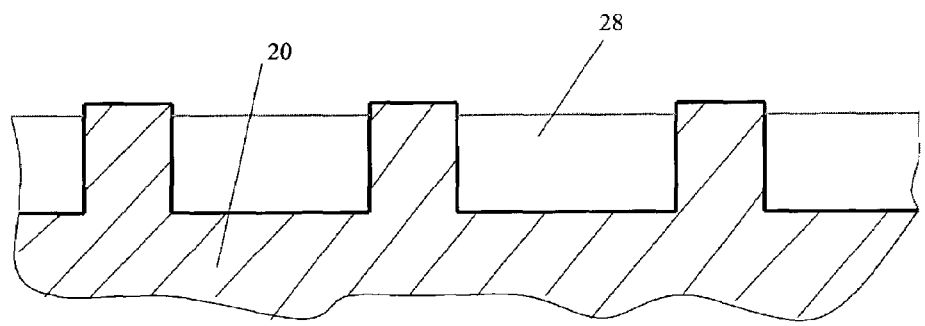
Figure 8:
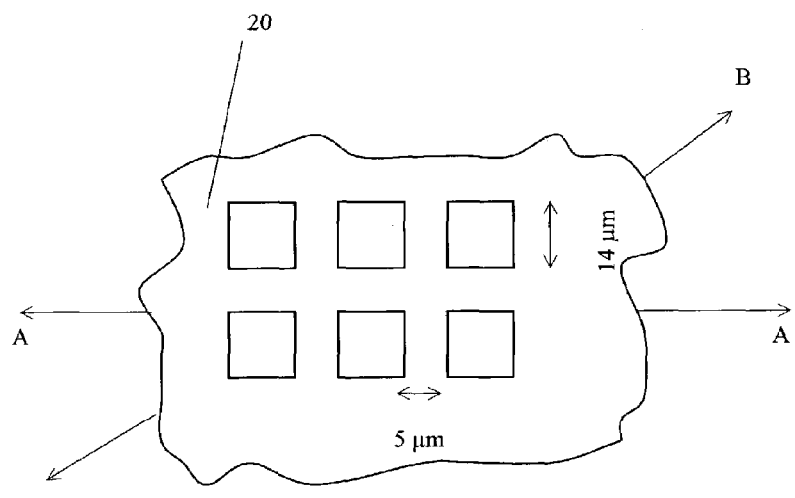
Figure 9:
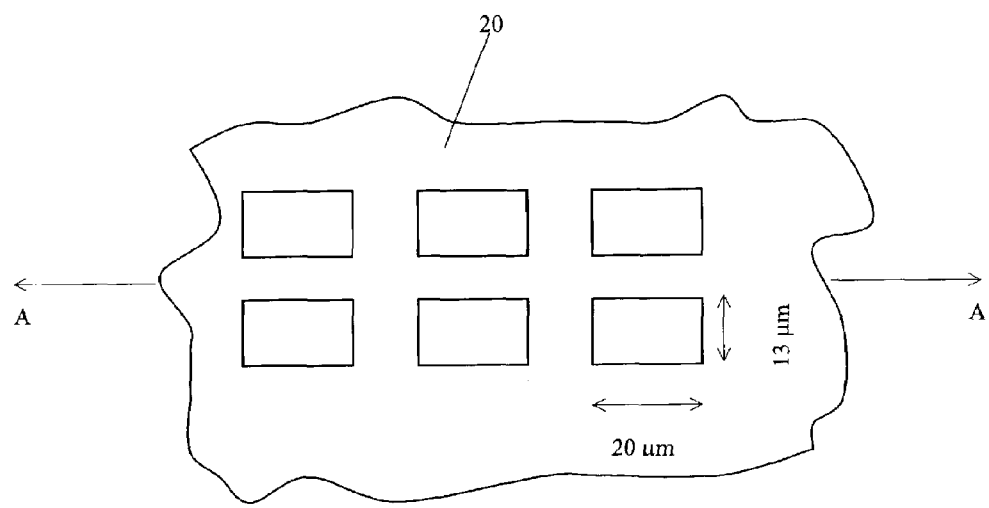
Figure 10:
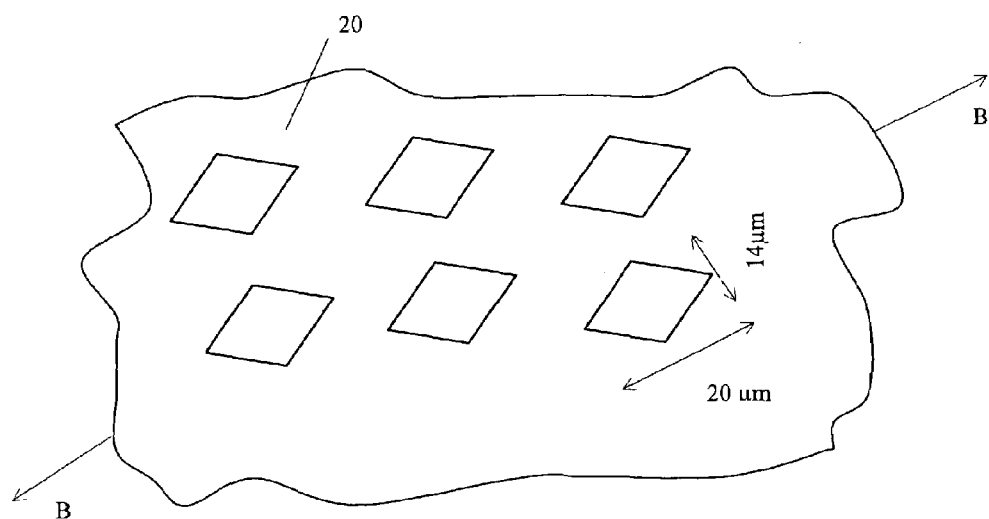
Figure 11:
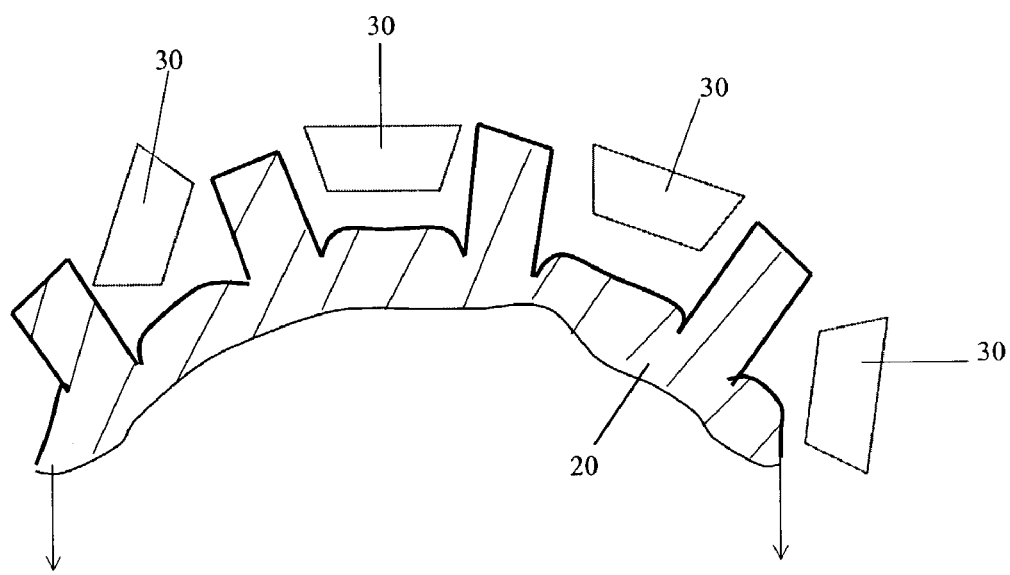
Figure 12:
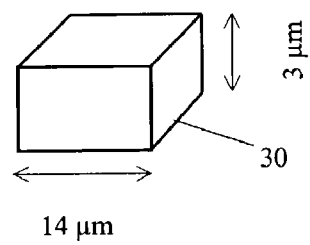

FIGS. 5, 6, and 7 show a plurality of fillings used to fill the receptacles in the flexible replica of FIGS. 3 and 4, in which the number of fillings is a controlled parameter that may be either a single filling, or a plurality of fillings;

FIGS. 8, 9 and 10 illustrate the flexible polymer replica, before stretching in FIG. 8, and after stretching in a direction along the edge and between the corners of the replica, in FIGS. 9 and 10;

FIG. 11 illustrates the step of releasing or popping the flakes out of the flexible replica upon bending thereof; and FIG. 12 is a perspective view illustrating a typical square or rectangular flake.

Figure 1:
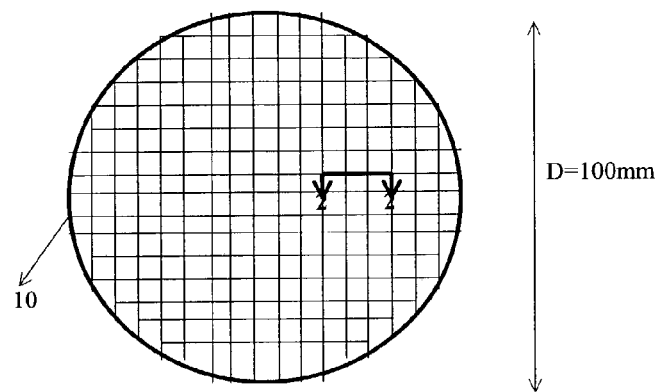
FIG. 1 is a top view of a photolithographically produced master or micropatterned master made with a laser printer, from which the mechanically flexible molds containing replicas of the flakes can be produced, in which as many molds as required may be made from the same master.
Figure 2:
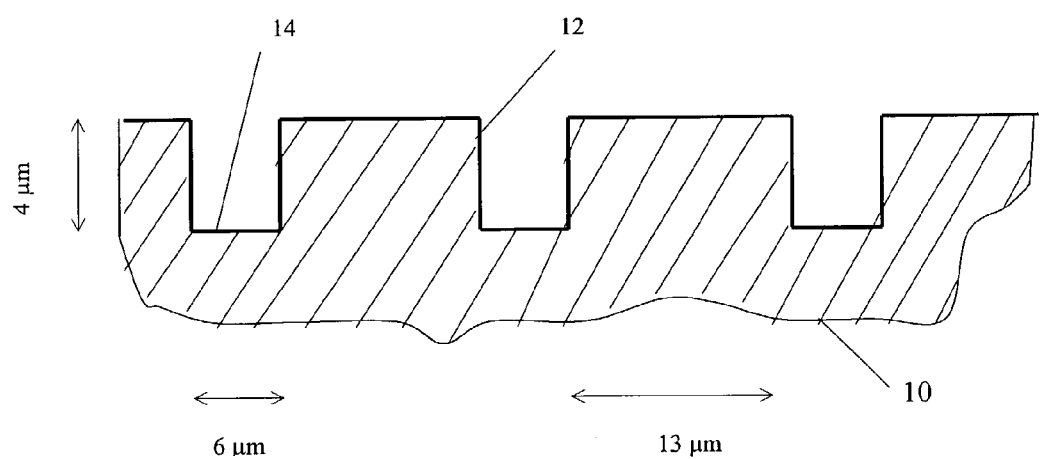
FIG. 2 is a fragmentary sectional view along with the line 2—2 in FIG. 1 showing the shape of the array of trenches and projections in the master of FIG. 1, the width of the projections may be the same as their length and equal to the length thereof so that the receptacles or wells in the master will initially be square.

Referring more particularly to the figures, there is shown in FIG. 1 a patterned silicon wafer 10, having, as shown in FIG. 2, square or rectangular projections 12 between trenches 14. The wafer may be provided with the pattern of projections and trenches by photolithographic techniques which are generally well known or by micropatterning with a laser printer as discussed in M. L. Branham et al., J. Mater. Res. 17, 1559 (July, 2002). Briefly, the desired pattern is applied to a photoresist coating on the surface of the wafer, which defines the pattern of trenches, and then the projections are made by etching. A sub-micron texture in the photographic master may be created, for example, by fine grinding or etching the tops of the projections 12 on the Si wafer. Fine grinding may be used to introduce random texturing. Specialized patterning and etching may be used to produce a regular pattern of depressions or protuberances.

As shown in the drawings, a typical width of the trenches is 6 µm, and the width and length (the sides) of the square projections is from 13–14 µm. The depth of the trenches varies from 3 to 6 µm. A mechanically flexible mold containing an array of wells which may be replicas of the desired flakes is made of flexible polymer material. The material is preferably a moldable polymer-elastomer which may be molded by covering the surface of the master having the projections 12 and trenches 14. In effect, the flexible replica is a reverse mold of the master. Generally, moldable polymers such as phenol-formaldehyde or preferably elastomeric polydimethylsiloxane (PDMS) may be used. PDMS material is obtainable commercially under the name "Sylgard 184" from Dow Corning Corp. of Midland, Mich., USA. More particularly, the PDMS material may be prepared for example, as described in a paper by A. Kumar et al. which appeared in Applied Physics Letters, Vol. 63(14), pages 202–204, Oct. 4, 1993. Briefly, ten parts of the silicone elastomer base may be mixed with one part of the silicone curing agent. The viscosity of the resulting liquid may be lowered with a solvent for PDMS, such as 200® fluid which has a viscosity of 20 cSt and is also available from the Dow Corning Corporation.

The PDMS mixture is poured directly onto the patterned surface of the silicon wafer 10 which may be held in a Petri dish or poured directly out the micropatterned master. The silicon wafer may have a thin film of 1% solution of polyvinyl alcohol (PVA) spin or dip coated on its surface prior to applying the PDMS mixture. The PVA is preferably low hydrolysis, 80–85% polyvinyl alcohol. The PDMS is allowed to cure at room temperature for approximately 24 hours. If PVA was used as a release layer, the wafer 10 and cured, solidified PDMS layer 20 thereon is soaked in deionized water for 24 hours to dissolve the PVA and release the PDMS layer from the silicon master. However, the use of PVA solution as a release agent and soaking in deionized water for releasing the PDMS layer from the master is optional and, after solidification (curing) the PDMS layer may be mechanically peeled from the master to provide the replica or mold which is used thereafter in the process for making the flakes. Enough PDMS mixture is used to make a layer whose thickness varies from approximately 0.2 mm to 2 mm.

Referring to FIG. 8, there is shown a top view of the replica mold 20 as it is released from the master. It will be noted that the wells are square in the view and have a depth of approximately 2–6 micrometers (µm) (suitably 5 µm) as shown in FIG. 4. The replica 20 is then adhered in unstretched (FIG. 8) or in stretched condition, such as shown in FIG. 9 or 10 on a substrate. Preferably, the substrate is a microscope slide of glass which may be several centimeters (cm) long, a few cm wide, and approximately 1 millimeter (mm) thick. One may proceed to the filling step described below in connection with FIGS. 5–7 if square, rather than rectangular or diamond shaped flakes are desired. If the flakes of rectangular or diamond shape are desired, the next step is interposed.

One edge of the flexible replica mold 20 is attached as by mechanical clamping or by an adhesive, such as epoxy, and the other end is mechanically pulled to stretch the mold. The stretching may be in the direction A—A, which is along the edge of the receptacles, or along the direction B—B, which is along the line through the corners of the receptacles or in both directions simultaneously. In the first case, stretching in the direction A—A, the replicas become rectangular, see FIG. 9. For stretching in the direction B—B, the replicas become diamond shaped, see FIG. 10. As noted above, if square flakes are desired, the PDMS mold is attached to the substrate slide without stretching. Prestretching makes the process more versatile in that one may obtain rectangular or diamond shaped configuration of the flakes with the same mold as used to create square flakes. One can make elliptical flakes from circular wells, or parallelograms from rectangular wells, or nonequilateral triangles from equilateral triangle-shaped wells, or larger squares from smaller squares (by stretching in two or more directions simultaneously).

The microscope slide substrate with the PDMS mold attached, is then set on a hotplate which is heated to approximately 130° C. After approximately 30 seconds, the filling step is initiated. The 30-second wait allows the PDMS mold to reach a temperature where a PCLC solution is in a liquid state, more particularly, the mold is heated to reach a temperature where the liquid consisting of PCLC, dissolved in a suitable solvent such as toluene (see below), will flow and easily fill the wells in the mold. This temperature also promotes the evaporation of the toluene solvent.

Referring to FIGS. 5, 6, and 7, the filling is carried out in a plurality of filling steps, for example 5. First, a drop of solution, for example, 25% by weight of PCLC dissolved in a suitable solvent such as toluene, is applied over the PDMS replica mold. This provides the first filling. The material is spread over the surface of the PDMS replica and into the wells 22 through the use of a knife, which may be a razor blade or a microscope slide edge. The engagement of the knife over the filling 24 in the wells 22 also aligns the PCLC molecules as is required to enhance their electrooptical action in an optical device, such as described in the above-identified publications. After the first filling, the PDMS mold containing the PCLC material is quenched by placing the substrate on a cold plate of high thermal conductivity material, such as copper, aluminum or lead, and which serves as a heat sink. Then the fillings are examined with a microscope. If the first filling serves to fill the replica so as to provide flakes of the desired thickness, further fillings are not required. In the case of further filling, such as shown in FIGS. 6 and 7, additional layers 26 and 28 are used. After each layer is made, the quenching and then examination with microscope is carried out to determine if the fillings are of the requisite depth to provide flakes of requisite thickness. The knife alignment is also used after each filling step.

It may be desirable to add a layer of non-PCLC material during the layering process. This layer may be of conductive material like Cabot Corp. Vulcan PA90 17 nm (nanometer) size conductive carbon black particles, or a layer of high dielectric constant $TiO_2$ particles (ex: Titanium oxide 35 nm powder sold by Marketech International, Port Townsend, Wash.). These layers may go into the PDMS mold in another solvent that does not dissolve the PCLC, but that evaporates easily, like methanol. Then one could continue the layering process. It could be advantageous to put these doping layers close to one face of the flake, or in the middle of a flake.

Referring to FIG. 11, the step of bending the PDMS mold and popping out the flakes (or platelets) 30 is illustrated. The bending may be accomplished manually by holding or securing or clamping the opposite ends of the PDMS replica over a collection surface, such as another microscope slide. The flakes 30 may be slightly trapezoidal in cross-section as shown in FIG. 11, to facilitate east of extraction from the bent PDMS mold. Inclination of the walls is preferable, since it aids the popping out of the flakes 30. The collected flakes 30 may be flushed from the slide with a high vapor pressure, chemically compatible liquid such as methanol, and stored in a vial for use in making the electrooptical cells of the type described in the above-identified publications.

From the foregoing description, it will be apparent that there has been provided, an improved method of fabricating flakes, preferably of PCLC material, which may be used in electrooptical devices. The method may be used to make flakes of other materials, so long as when solid, the materials become more rigid than the flexible mold in which they are formed. As noted above, another utility for flakes made in accordance with the invention is in MEMS devices. Variations and modifications in the herein described method will undoubtedly suggest themselves to those skilled in the art. For example, it has been found that for the PDMS mechanically flexible or deformable mold, the amount of curing agent may be varied to obtain a desired relation of deformation with stretching stress, and the amount of deformation for a given amount of stretching stress has been found to be optimal for 0.75 parts curing agent. Also, the use of Dow Corning 200® may raise the Young's modulus of the cured PDMS mold, making it harder to stretch. Thus, the amount of Dow Corning 200® fluid may be useful for lowering viscosity for filling the Si master, but if it is not required, it may not be used. Accordingly, the foregoing description should be taken as illustrative and not in a limiting sense.

The invention claimed is:

1. The method of making flakes or platelets of certain configurations which comprises the steps of:
    molding said flakes or platelets in a mold of material more flexible than said flakes or platelets when solid and in wells in a surface of said mold having said certain configuration;
    flexing said mold to cause said surface to bend when said flakes or platelets become solid therein so as to release said flakes or platelets from said mold; and
    said configuration desired for said flakes or platelets is obtained by the step of molding said mold with the aid of a master having projections and trenches of said configurations to provide an inverse replica of said master.

2. The method according to claim 1 further comprising the step of filling said wells with material in liquid state, which when solid forms said solid flakes or platelets in said mold.

3. The method according to claim 2 further comprising the step of treating surfaces of said wells with a release agent prior to said filling step.

4. The method according to claim 2 further comprising the step of collecting said flakes or platelets when released from said mold.

5. The method of making flakes or platelets of certain configuration which comprises the steps of:
    molding said flakes or platelets in a mold of material more flexible than said flakes or platelets when solid and in wells in a surface of said mold having said certain configuration;
    flexing said mold to cause said surface to bend when said flakes or platelets become solid therein so as to release said flakes or platelets from said mold; and
    carrying out said molding step while elongating said mold in a selected direction or directions generally in the plane of the surface of said mold.

6. The method according to claim 5 wherein said elongating step is carried out by stretching said mold in one or more directions.

7. The method according to claim 1 wherein said certain configurations are selected from the group consisting of square, rectangular, diamond, triangular, circular, elliptical, trapezoidal, and parallelogram configurations.

8. The method according to claim 6 wherein said wells are square along a side parallel to said surface of said mold and said direction is selected from a direction along a side of said square or a direction along a line parallel to or coextensive with a line between the opposite corners of said square to produce flakes or platelets of said rectangular and diamond configuration, respectively.

9. The method according to claim 1 wherein said projections and trenches and said wells and said resulting flakes or platelets are of microscopic dimensions.

10. The method according to claim 1 further comprising the step of photolithographically forming or laser printing said projections and trenches on a surface of said master.

11. The method according to claim 6 wherein said elongating step is carried out in one or more directions related to the shape of said wells.

12. The method according to claim 1 further comprising the step of treating the master to impart a flat, specular, or rough, matte surface to the mold, and thus to the flakes.

13. The method according to claim 1 wherein said mold is made of a moldable elastomeric polymer material.

14. The method according to claim 13 wherein said polymer material is selected from the group consisting of phenol-formaldehyde and polydimethyl-siloxane (PDMS).

15. The method according to claim 1 wherein said mold is mounted on a substrate which is heated to a temperature depending upon the melting temperature and the glass transition temperature of said flake or platelet material.

16. The method according to claim 15 wherein the temperature to which said substrate is heated is above the melting temperature and below the glass transition temperature of said flake or platelet material.

17. The method according to claim 1 wherein said flake or platelet material is a polymer liquid crystal material in a solution thereof when said wells are filled.

18. The method according to claim 17 wherein said wells are filled with said solution in one or more layers.

19. The method according to claim 18 wherein said one or more layers is swept with a knife to align the molecules of said liquid crystal material.

20. The method according to claim 18 wherein said layers are allowed to cure successively in the order in which said layers are formed in said wells.

21. The method according to claim 18 wherein selected ones of said layers may be of material other than said polymer liquid crystal material.

22. The method according to claim 21 wherein said material of said selected ones of said layers may be selected from the group consisting of conductive material, and high dielectric constant particles.

23. The method according to claim 22 wherein said conductive material comprises microscopic carbon black particles.

24. The method according to claim 22 wherein said high dielectric constant particles are microscopic particles of titanium oxide.

25. The method according to claim 5 wherein said configurations desired for said flakes or platelets is obtained by the step of molding said mold with the aid of a master having projections and trenches of said configurations to provide an inverse replica of said master.

* * * * *